United States Patent
Benson et al.

(10) Patent No.: US 9,394,990 B2
(45) Date of Patent: Jul. 19, 2016

(54) MANUAL TRANSMISSION SHIFTER WITH GUIDE DEVICE FOR LASH REDUCTION

(71) Applicants: Robert A Benson, Bloomfield Hills, MI (US); Jeffrey J Sawruk, Clarkston, MI (US); Lawrence K Laba, Lake Orion, MI (US); Eugene H Polan, Jr., Madison Heights, MI (US); Michael W Gapski, Eastpointe, MI (US); Christopher W Collins, Commerce, MI (US)

(72) Inventors: Robert A Benson, Bloomfield Hills, MI (US); Jeffrey J Sawruk, Clarkston, MI (US); Lawrence K Laba, Lake Orion, MI (US); Eugene H Polan, Jr., Madison Heights, MI (US); Michael W Gapski, Eastpointe, MI (US); Christopher W Collins, Commerce, MI (US)

(73) Assignee: FCA US LLC, Auburn Hills, MI (US)

( * ) Notice: Subject to any disclaimer, the term of this patent is extended or adjusted under 35 U.S.C. 154(b) by 108 days.

(21) Appl. No.: 14/307,558

(22) Filed: Jun. 18, 2014

(65) Prior Publication Data

US 2014/0373660 A1 Dec. 25, 2014

Related U.S. Application Data

(60) Provisional application No. 61/836,705, filed on Jun. 19, 2013.

(51) Int. Cl.
*B60K 20/00* (2006.01)
*F16H 59/02* (2006.01)
(Continued)

(52) U.S. Cl.
CPC .......... *F16H 59/0278* (2013.01); *F16H 59/042* (2013.01); *F16H 61/24* (2013.01); *F16H 2061/242* (2013.01); *Y10T 74/20085* (2015.01); *Y10T 74/20177* (2015.01)

(58) Field of Classification Search
CPC ... F16H 61/24; F16H 61/36; F16H 2059/026; F16H 2061/34; F16H 2061/36; F16H 2061/242; F16H 63/33

USPC .......... 74/473.21, 473.36; 180/334, 336, 347, 180/337
See application file for complete search history.

(56) References Cited

U.S. PATENT DOCUMENTS

| 3,975,970 A | 8/1976 | Elfes et al. |
| 4,912,997 A | 4/1990 | Malcolm et al. |

(Continued)

FOREIGN PATENT DOCUMENTS

| DE | 2228971 A1 | 1/1973 | |
| DE | 102006055181 | * 5/2008 | .............. F16H 63/38 |

(Continued)

OTHER PUBLICATIONS

International Search Report and Written Opinion dated Aug. 28, 2014 for International Application No. PCT/US2014/042927, International Filing Date Jun. 18, 2014.

*Primary Examiner* — Terence Boes
*Assistant Examiner* — Joseph Brown
(74) *Attorney, Agent, or Firm* — Ralph E. Smith (57) ABSTRACT

A system for lash reduction of a shifter for a manual transmission includes a shifter assembly having a housing, a shift lever and a shift lever guide device positioned in the housing. The guide device includes a plurality of shift channels connected by a select channel and defines a shift pattern for the shift lever. The transmission gate guide includes a corresponding plurality of shift finger slots connected by a select slot and defines a pattern for a shift finger of the transmission. Movement of the shift lever into one of the channels operatively moves the shift finger into a corresponding one of the slots. Each of the channels includes a channel width complimentary to a width of the shift lever so as to substantially reduce lateral free play of the shift lever when received in the channels while allowing longitudinal motion of the shift lever in the channels.

13 Claims, 5 Drawing Sheets

(51) Int. Cl.
*F16H 59/04* (2006.01)
*F16H 61/24* (2006.01)

(56) References Cited

U.S. PATENT DOCUMENTS

| | | |
|---|---|---|
| 8,556,772 B2 | 10/2013 | Biallas |
| 2009/0199669 A1* | 8/2009 | Rubsam ................ F16H 59/044 74/473.3 |
| 2012/0297913 A1 | 11/2012 | Biallas |
| 2013/0340558 A1* | 12/2013 | Kvarnstrom .......... F16H 59/105 74/473.33 |

FOREIGN PATENT DOCUMENTS

| | | | |
|---|---|---|---|
| DE | 102006055181 A1 | 5/2008 | |
| EP | 1571374 | 9/2005 | |
| EP | 1571374 A1 * | 9/2005 | ............ F16H 59/042 |
| WO | WO 03085481 A2 * | 10/2003 | ............ F16H 59/044 |
| WO | 2005/019702 A1 | 3/2005 | |

\* cited by examiner

MANUAL TRANSMISSION SHIFTER WITH GUIDE DEVICE FOR LASH REDUCTION

CROSS-REFERENCE TO RELATED APPLICATIONS

This application claims benefit of U.S. Provisional Application Ser. No. 61/836,705 filed on Jun. 19, 2013. The disclosure of the above application is incorporated herein by reference in its entirety.

FIELD

The present disclosure relates generally to a shifter for a manual transmission for a motor vehicle and, more particularly, to a shifter having a guide device for lash reduction.

BACKGROUND

Conventional manual transmissions and associated shift mechanisms generally include a shifter assembly having a shift lever operable to be manipulated by a driver to engage various forward and reverse gears of the transmission. The shift lever typically extends from a base of the shifter assembly and is pivotable relative to the base. When the shift lever is positioned into a desired gear engagement position, however, the shift lever is typically not restricted from movement in a lateral or cross-car direction by the shifter assembly. As a result, there is lateral lash or free play of the shift lever detectable by a driver of the vehicle when the shift lever is in one of the various gear engagement positions. Thus, while conventional shifter assemblies for manual transmissions work for their intended purposes, there remains a need for improvement in the relevant art.

SUMMARY

In one aspect, a system for lash reduction of a shifter for a manual transmission is provided in accordance with the teachings of the present disclosure. In an exemplary implementation, the system includes a shifter assembly adapted to be positioned in an interior of a vehicle and a transmission gate guide associated with the manual transmission. The shifter assembly includes, in one exemplary implementation, a housing, a shift lever pivotable relative to the housing and a shift lever guide device positioned in the housing. The shift lever guide device defines, in one exemplary implementation, a plurality of longitudinally extending shift channels connected by a laterally extending select channel such that the channels define a shift pattern for the shift lever. The transmission gate guide defines, in one exemplary implementation, a corresponding plurality of longitudinally extending shift finger slots connected by a laterally extending select slot. The slots define a motion pattern for a shift finger operatively associated with the manual transmission, and movement of the shift lever into one of the channels operatively moves the shift finger into a corresponding one of the slots. In an exemplary implementation, each of the channels includes a channel width complimentary to a width of a portion of the shift lever configured to be received in the channels so as to substantially reduce lateral free play of the shift lever when received in one of the channels while allowing longitudinal motion of the shift lever in the one of the channels.

In some implementations, the transmission gate guide and the shift lever guide device are configured such that upon movement of the shift lever from the select channel toward one of the channels, the shift finger and the shift lever enter the respective one of the shift channels and corresponding shift slot at different times. In some implementations, the transmission gate guide and the shift lever guide device are configured such that upon movement of the shift lever from the select channel toward one of the shift channels, the shift lever enters one of the shift channels before the shift finger enters the corresponding shift slot. In some implementations, the transmission gate guide and the shift lever guide device are configured such that upon movement of the shift lever from the select channel toward one of the shift channels, the shift lever enters the one of the shift channels after the shift finger enters the corresponding shift slot.

In some implementations, the shift lever guide device includes a guide plate positioned within the shifter housing above a pivot of the shift lever. In some implementations, the shift lever guide device includes a guide plate positioned within the shifter housing between a pivot of the shift lever and a top of the shifter housing. In some implementations, the shift lever guide device includes a guide plate positioned within the shifter housing between a pivot of the shift lever and a bottom of the shifter housing.

In some implementations, the channel width provides a channel clearance relative to the width of the portion of the shift lever configured to be received in the channels, and each of the slots includes a slot width providing a slot clearance relative to a width of a portion of the shift finger configured to be received in the slots. In these implementations, the slot clearance is greater than the channel clearance.

In some implementations, the channel width is sized to provide a substantially slip fit of the portion of the shift lever configured to be received in the channels. The slip fit is configured to substantially reduce lateral free play of the shift lever when received in the channels while allowing longitudinal motion of the shift lever in the channels.

In some implementations, one of the slots and the channels includes a shorter longitudinal length than the other of the slots and the channels such that, upon movement of the shift lever from the select channel toward one of the shift channels, the shift finger and the shift lever enter the respective one of the shift channels and corresponding shift slot at different times.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
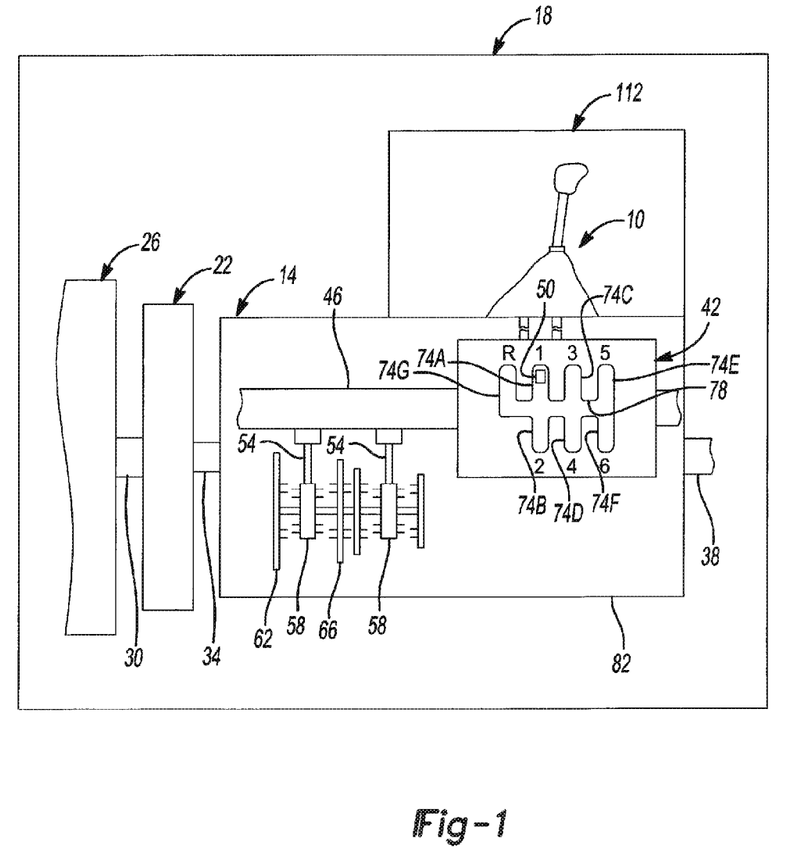
FIG. 1 is a schematic illustration of an exemplary shifter assembly operably coupled to an exemplary manual transmission of a motor vehicle according to the principles of the present disclosure.

Referring now to the drawings, where like reference numerals refer to like components or features, an exemplary shifter assembly is schematically shown and generally identified at reference numeral 10 in FIG. 1. In the example illustrated, the shifter assembly 10 is operably coupled to an exemplary manual transmission 14 of an associated vehicle 18. The manual transmission 14 is coupled to a clutch 22, which is coupled to a prime mover 26, such as an engine.

In accordance with various aspects of the present disclosure that will be discussed in greater detail below, the shifter assembly 10 includes a shift lever guide plate or device configured to substantially reduce lateral lash or free play of the shift lever when positioned in a gear engagement position (e.g., first gear). In some implementations, and as will also be discussed in greater detail below, the shift lever guide plate is housed within a housing of the shifter assembly positioned in an interior of the vehicle. In an exemplary implementation, the shift lever guide plate is in addition to a transmission gate guide associated with the manual transmission 14 and configured to guide and/or define movement of a transmission shift finger or similar member.

A discussion of the shift lever guide plate in connection with associated particular configurations of the transmission gate guide will follow a general discussion below of the manual transmission and operational movement of a shift lever of the shifter assembly. With additional reference to FIG. 1A, the manual transmission 14 includes, in the example illustrated, the friction clutch 22 operably disposed between an output 30 of the engine 26 and a transmission input shaft 34 and output shaft 38. Manual transmission 14 also includes, in the example illustrated, a transmission gate guide schematically shown at 42. In one exemplary implementation, the transmission gate guide is coupled to or formed with a shift cylinder or similar member. A shift actuation shaft 46 or similar member is operable associated with the shift cylinder and includes a location pin or shift finger 50 that extends into the transmission gate guide 42, as shown for example in FIG. 1.

Figure 1A:
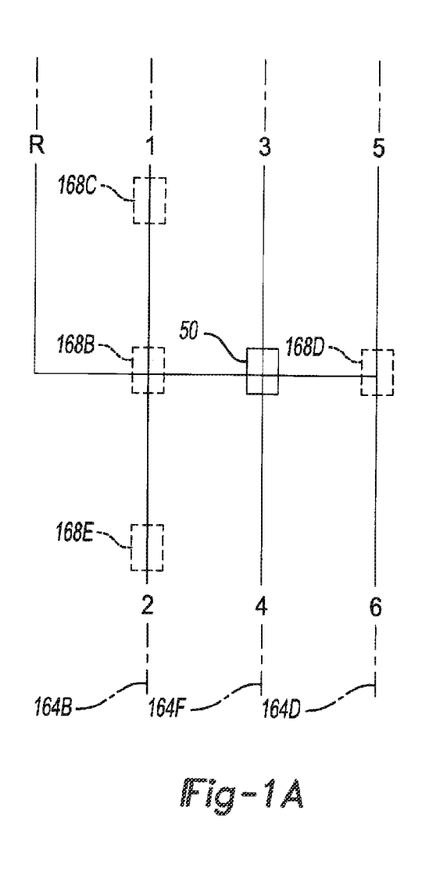
FIG. 1A is a schematic illustration of exemplary movement of a transmission shift finger or similar member according to the principles of the present disclosure.

A plurality of shift forks 54 are operatively associated with the shift actuation member 46 at various locations to engage and translate synchronizer clutches 58. In the example illustrated, each of the synchronizer clutches 58 are associated with one or more gears, for example first and second gears 62, 66, that are positioned on the same or different shafts. The transmission gate guide 42 defines a plurality of spaced apart longitudinal channels or slots or gates 74A, 74B, 74C, 74D, 74E, 74F and 74G (collectively channels or slots or gates 74) that are arranged on a plate or circumferentially in or on the outside surface of the shift cylinder and which are connected by a central laterally extending channel or slot 78.

The location finger 50 can be mounted to the shift actuation member 46 or another suitable component within a transmission housing 82 and can extend radially into the slots 74 and slot 78. The location finger 50 and the transmission gate guide 42 cooperate to guide and control the motion of the shift actuation member 46. This motion corresponds to the motion of a shift lever of the shifter assembly 10 for engaging the various forward and reverse gears of manual transmission 14, as can be appreciated by one of ordinary skill in the art. It will also be appreciated that the foregoing discussion of manual transmission 14 is exemplary and for illustrative purposes only and various other manual transmission configurations utilizing the same or similar transmission gate guide 42 are within the scope of the present disclosure.

With additional reference to FIGS. 1B-2B and continuing reference to FIGS. 1-1A, examples of shifter assembly 10 will now be discussed in greater detail. The shifter assembly 10 includes, in one exemplary implementation, a shifter housing 94, a shift lever assembly 98 pivotable relative to housing 94 and a shift lever guide device or plate 102 positioned in and/or integrated with housing 94. In one exemplary implementation, the shifter assembly 10 is positioned in an interior 112 of vehicle 18 (FIG. 1) remote from manual transmission 14 and is operably coupled to transmission 14 using an exemplary two cable or link system 116. In one exemplary implementation, the shift lever assembly 98 includes a shift lever 120, a shift knob 124, a pivot 128, a gear engagement member or portion 132 and a shift plane or fork select member or portion 136.

Figure 2A:
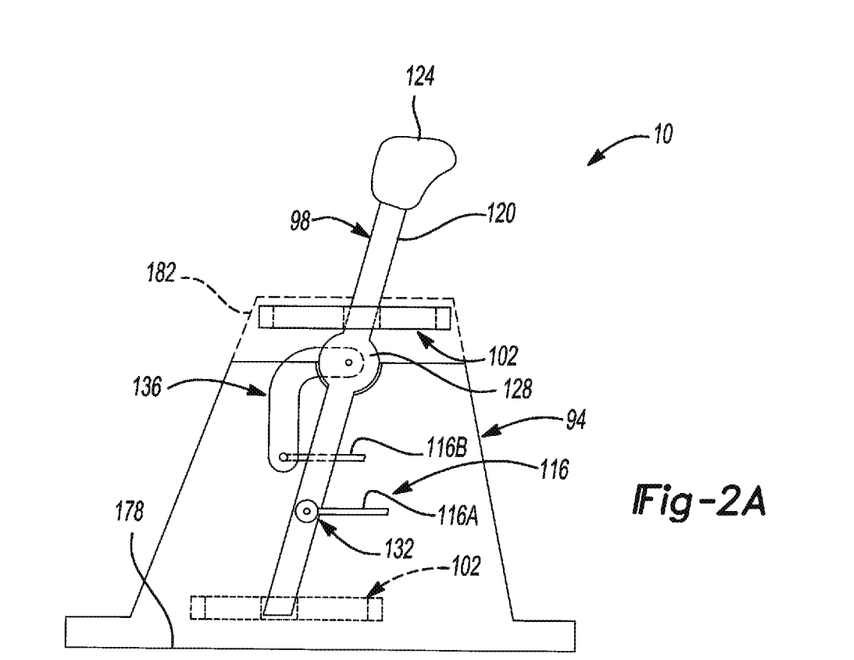
FIG. 2A is a schematic illustration of an exemplary shifter assembly according to the principles of the present disclosure.

In the exemplary implementation shown in FIG. 2A, the shift lever assembly 98 includes a central or intermediate pivot 128 supported by and/or in the housing 94. In the exemplary implementation shown in FIG. 2B, the shift lever assembly 98 includes a bottom pivot 128 supported by and/or in housing 94. In both examples, the pivot 128 is shown as an exemplary ball pivot supported in a corresponding socket defined by or coupled to housing 94. The shift knob 124 is positioned on an upper or top portion of the shift lever 120 spaced from housing 94 and is configured to be grasped by a vehicle driver to input the motion required to engage the various gears of manual transmission 14.

Figure 2B:
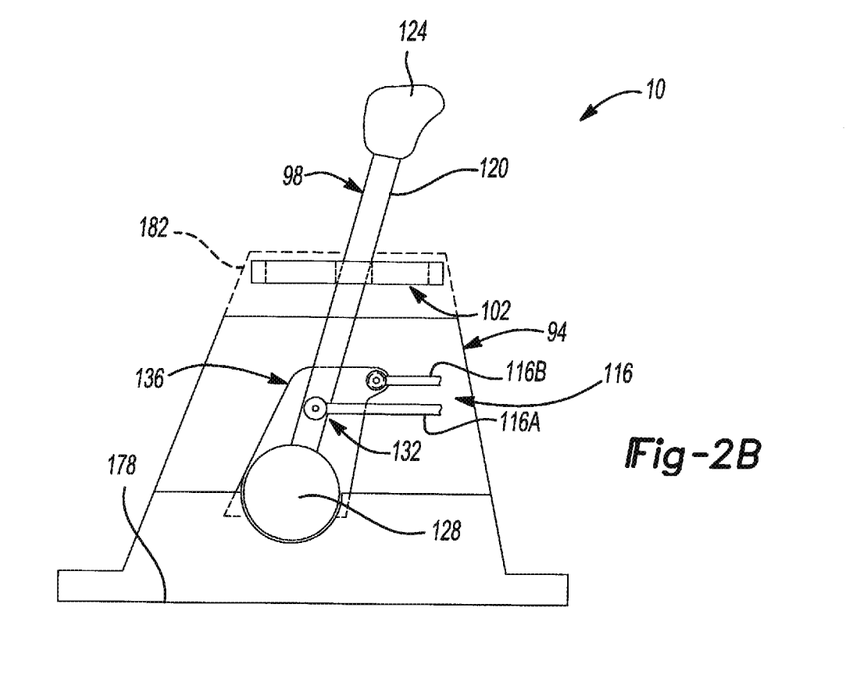
FIG. 2B is a schematic illustration of an exemplary shifter assembly according to the principles of the present disclosure.

In one exemplary implementation, the gear engagement portion 132 includes a portion of the shift lever 120 coupled directly or indirectly to a shift cable or link 116A of the two cable system 116. In the illustrated examples, the shift plane select member 136 includes a bracket (e.g., bell crank) or similar member operatively coupled to the shift lever 120 and to a select cable or link 116B of the two cable system 116.

Figure 1B:
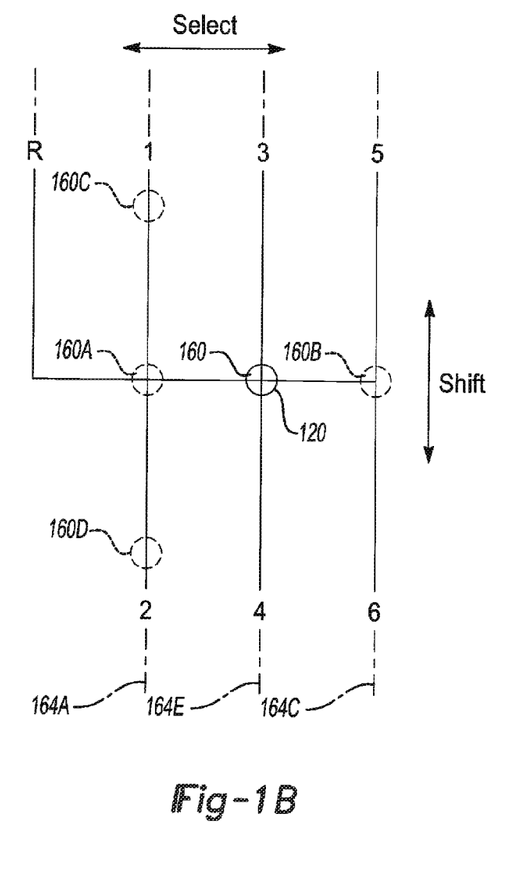
FIG. 1B is a schematic illustration of an exemplary shift lever shift pattern and associated exemplary movement of the shift lever according to the principles of the present disclosure.

With particular reference to FIGS. 1A and 1B and continuing reference to FIGS. 1 and 2A-2B, general operational movement of the shift lever 120 will now be discussed in connection with an exemplary shift lever pattern. It will be appreciated that this discussion of the general shift lever operational movement does not focus on the function and operation of the shift lever guide device 102 and associated particular configurations of transmission gate guide 42, which are discussed in greater detail herein. Lateral or cross-car movement of shift lever 120 correspondingly moves shift plane select member 136, which correspondingly moves associated select cable 116B. In the example illustrated in FIGS. 1A and 1B, laterally moving shift lever 120 from a neutral position 160 to the left or driver side of the vehicle 18 to a position 160A in a first and second gear shift plane 164A correspondingly moves the shift plane select member 136 in a first direction and the shift finger 50 to a position 168B in a first and second gear shift plane 164B. This action, as can be appreciated by those skilled in the art, operatively associates the shift lever 120 with the shift fork 54 associated with first and second gears 62, 66 in the example manual transmission 14 configuration discussed above.

Continuing with this example, movement of the shift lever 120 in the opposite lateral direction moves the shift lever 120 to a position 160B in a fifth and sixth gear shift plane 164C and the shift plane select member 136 in a second opposite direction. This correspondingly moves the shift finger 50 to a position 168D in a fifth and sixth gear shift plane 164D. As can be seen in FIG. 1B, the neutral position 160 is in the shift lever third and fourth gear shift plane 164E and the transmission plate shift plane 164F.

Once a shift plane has been selected by the shift lever 120 in the exemplary manner discussed above, forward or rearward movement of the shift lever 120 in that shift plane engages the gears associated with that shift plane. For example, and as will be readily appreciated by those skilled in the art, movement of the shift lever 120 in a forward direction in the first and second gear shift plane 164A to a position 160C causes the gear engagement portion 132 to correspondingly move the shift cable 116A, which causes the shift finger 50 to advance in slot 74A to position 168C and the operatively associated shift fork 54 to facilitate engagement of first gear 62.

Movement of the shift lever 120 in the rearward or second direction in the first and second gear shift plane 164A to a position 160D causes the gear engagement portion 132 to correspondingly move the shift cable 116A in an opposite direction, which causes the shift finger 50 to advance in slot 74B to position 168E and the operatively associated shift fork 54 to facilitate engagement of second gear 66. Operation of the shift lever 120 to engage third and fourth gears associated with shift plane 164E and fifth and sixth gears associated with shift plane 164C is similar to that of shift plane 164A and will not be further discussed herein. It will be appreciated that the shift pattern and associated shift planes discussed above and herein is exemplary and for illustrative purposes only and other shift patterns and numbers of gears associated with manual transmission 14 are well within the scope of the present disclosure.

With particular reference to FIGS. 3A-4B and continuing reference to FIGS. 1-2B, example configurations and operation of the shift lever guide device or plate 102 and transmission gate guide 42 will now be discussed in accordance with various aspects of the present disclosure. As briefly mentioned above, when the manual transmission 14 is placed into gear (e.g., first gear in the example shown in the figures), the shift lever 120 extending from the housing 94 can exhibit lash or free play in the lateral direction, which is detectable by a driver and generally undesirable. The shift lever guide plate 102 is configured to control and reduce such lateral lash or free play of the shift lever 120 when positioned in one of the various gear engagement positions. In this regard, and as will be discussed below, the shift lever guide device 102 and the transmission gate guide 42 include specific configurations designed to cooperate so as to not inhibit shift lever 120 motion associated with shifting into a desired gear while also substantially reducing or eliminating such lateral lash or free play. In one exemplary implementation, the shift lever guide plate 102 cooperates with the transmission gate guide 42 to control lateral lash of the shift lever 120 while not inhibiting or affecting fore-aft movement of shift lever 120.

In one exemplary implementation, the shifter guide plate 102 is positioned at or near a bottom 178 of the shifter housing 94 and is configured to cooperate with a lower portion of shift lever 120, as shown for example in FIG. 2A. In another exemplary implementation, the shifter guide plate 102 is positioned at or near a top 182 of housing 94 and is configured to cooperate with an upper portion of shift lever 120, as shown for example in FIGS. 2A and 2B. In this regard, it will be appreciated that while the discussion will continue with reference to the shifter guide plate 102 being positioned in the housing 94 so as to cooperate with the upper portion of shift lever 120 (or a portion of shift lever 120 above pivot 128), the shifter guide plate 102 can be located in various positions relative to the shifter housing 94 so as to cooperate with the shift lever 120.

In one exemplary implementation, the shifter guide plate 102 includes a plurality of longitudinally extending channels or slots 190A-190G (collectively channels or slots 190) corresponding to shift lever movement for engagement of first through sixth and reverse gears of manual transmission 14. The channels 190 extend from and/or communicate with an overall open area or lateral channel 192 that allows for free movement of the shift lever 120 relative to the shifter guide plate 102. The channels 190, in one exemplary implementation, include a width 196 corresponding to or complimentary to an outer width or diameter 202 of the shift lever 120 such that when shift lever 120 is positioned in one of channels 190, lateral or cross-car lash or free play of shift lever 120 is substantially reduced or eliminated. It will be appreciated that a small amount of design clearance between the shift lever 120 and edges of the channels 190 is generally necessary, such as a slip or complementary fit 204, to provide for fore-aft movement in the channels 190, but this minimized clearance or complimentary fit substantially reduces and/or eliminates free play of the shift lever 120 when positioned in the channels 190.

In an exemplary implementation, the shift finger 50 includes a width 206 smaller than a width 210 of the slots 74 thereby providing a clearance 212 to allow for tolerance and compliance considerations of the transmission 14 and shifter assembly 10 designs. In other words, this clearance is larger than the slip or complimentary fit discussed above. Such clearance also provides for reducing potential interference with the shift finger 50 and shift lever 120 both attempting to enter the respective slots 74 and channels 190. In this regard, the shifter guide plate 102 and the transmission gate guide 42 can also be configured in various manners to aid in reducing or eliminating such potential interference or fighting between the shift finger 50 and the shift lever 120 entering the respective slots 74 and channels 190. For example and as will be discussed in greater detail below, the transmission gate guide 42 and the shift lever guide device 102 can be configured such that the shift lever 120 enters the channels 190 before (shifter lead) or after (transmission lead) the shift finger 50 enters the corresponding slots 74.

Figure 3A:
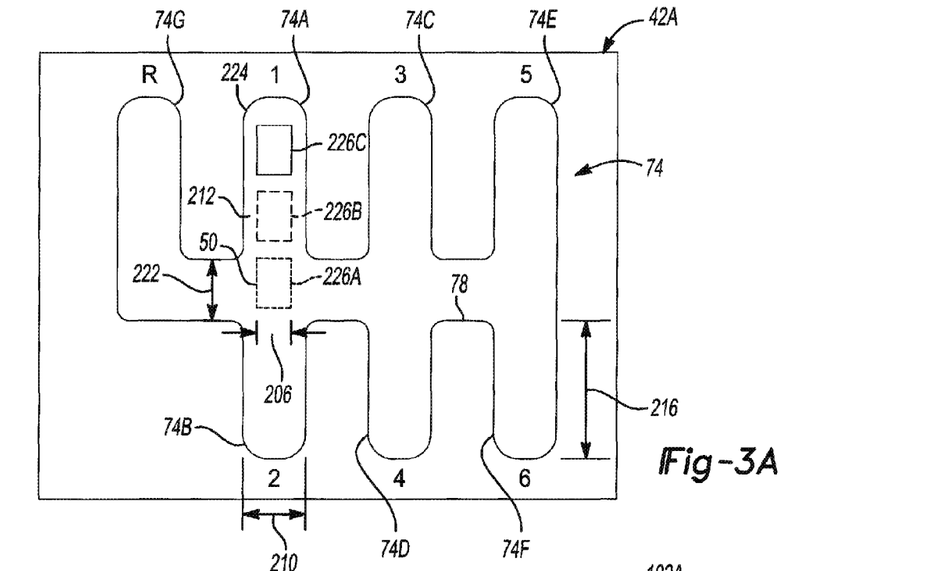
FIGS. 3A and 3B are views of an exemplary transmission gate guide and an exemplary shifter assembly guide plate and associated exemplary movement of the respective shift finger and shift lever according to the principles of the present disclosure.
Figure 3B:
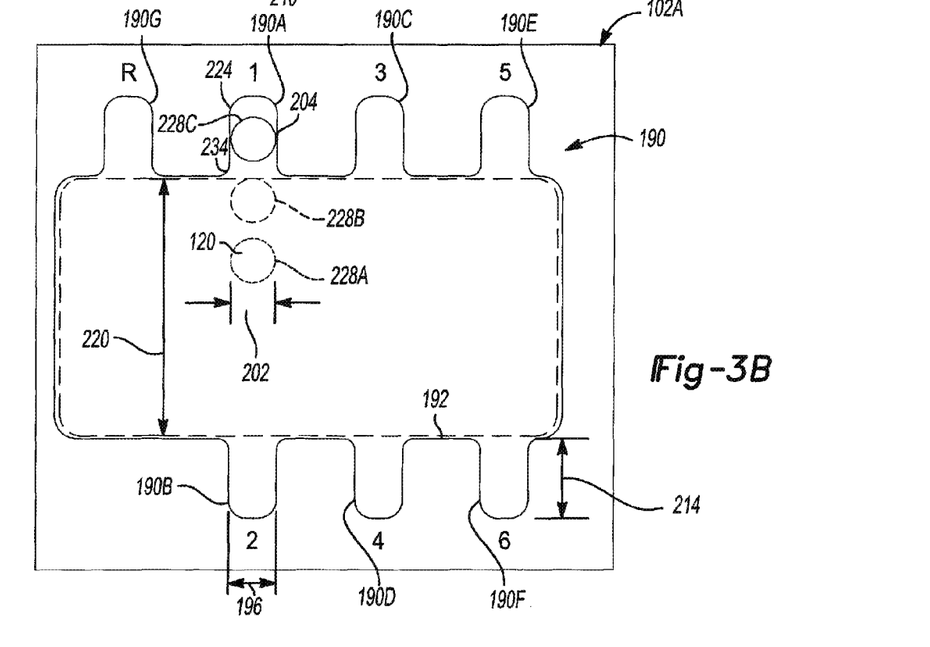

With particular reference to FIGS. 3A and 3B, an exemplary implementation of the transmission lead configuration is shown. In the exemplary implementation illustrated, the shift lever guide plate 102A is configured to be non-restrictive to movement of the shift lever 120 up to the point of the end or near the end of travel of the shift finger 50 in the slots 74 of transmission gate guide 42A, which corresponds or substantially corresponds to the engagement of the desired transmission gear. In this exemplary implementation, the slots 74 are positioned relative to the lateral slot 78 of gate guide 42A and the channels 190 are positioned relative to the lateral channel 192 of guide plate 102A such that the shift finger 50 enters the desired one of the slots 74 before the shift lever 120 enters the corresponding one of the channels 190. In one exemplary implementation of this transmission lead configuration, the guide plate channels 190 include a shorter length 214 than a length 216 of gate guide slots 74. The lateral channel 192 of the shifter guide plate 190 also includes, in the exemplary implementation illustrated, a larger width 220 and resulting open area than a width 222 of the lateral slot 78 of gate guide 42. It will be appreciated, however, that the lengths/widths of the channels/slots can be varied in different implementations of the plates in connection with different transmission and shifter implementations so long as they provide for the shift finger 50 or similar member entering slots 74 before the shift lever 120 enters the corresponding channels 190.

For example, when the shift lever 120 is used to engage one of reverse and first through sixth gears, such as first gear 62, the shift finger 50 travels into transmission gate guide 42 slot 74A, as shown for example in FIG. 3A. As the shift finger 50 nears the end of its travel in slot 74A (e.g., approaches the end 224 of the channel), the shift lever 120 enters corresponding channel 190A of shifter guide plate 102, as shown for example in FIG. 3B. As can be seen in the exemplary configuration shown in FIGS. 3 and 4, the shift lever 120 does not enter gate 190A in shifter guide plate 102 until the shift finger 50 has already entered slot 74A and is approaching the end of its travel in slot 74A.

In other words, and with particular reference to the exemplary movement illustrated in FIGS. 3A and 3B, when shift finger 50 enters slot 74A in position 226A from lateral slot 78 responsive to movement of the shift lever 120 associated with engaging first gear, the shift lever 120 is still in lateral channel or open area 192 and outside of corresponding channel 190A, as schematically illustrated by position 228k Continuing with this example, as shift finger 50 travels further into slot 74A, such as at approximately the middle of slot 74A at position 226B (which is upstream of being near the end of travel of slot 74A), the shift lever 120 is approaching the entrance 234 of channel 190A at position 228B. The entrance 234 of each channel 190 can be rounded, chamfered or angled to aid in the entry of shift lever 120. Then, as the shift finger 50 approaches or is at the end of its travel in slot 74A at position 226C, the shift lever 120 enters channel 190A as shown by position 228C. In this position, lateral movement or free play of shift lever 120 is substantially reduced or eliminated by the walls or sides of channel 190A restraining such movement of shift lever 120.

It will be understood that the illustrated positions 226A-226C and corresponding positions 228A-228C are exemplary positions for illustrative purposes only to show the shifter guide plate 102 allowing non-restrictive movement the shift lever 120 until the shift finger 50 is within an appropriate transmission shift slot 74 and, in some implementations, near the end of travel of that gate. In one exemplary implementation, the channels 190 include ends 224 spaced apart a predetermined distance from the typical end of travel of the shift lever 120 (e.g., position 228C) associated with the end of travel of shift finger 50 (e.g., position 226C) so as to provide a positive end-stop or over travel stop of for the shift lever 120 in the event of potentially excessive force being applied to shift lever 120. This configuration provides for, among other features, preventing the stretching and/or breaking of cables 116 coupling the shift lever assembly 108 to the manual transmission 14.

Figure 4A:
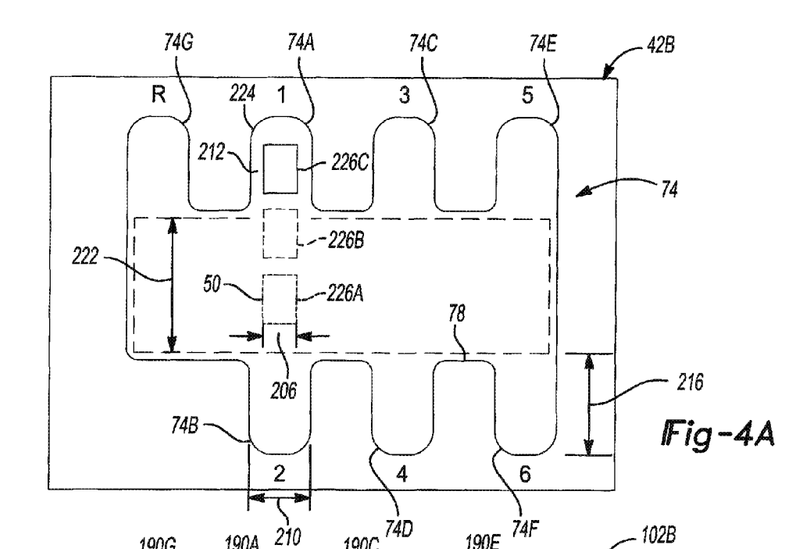
FIGS. 4A and 4B are views of an exemplary transmission gate guide and an exemplary shifter assembly guide plate and associated exemplary movement of the respective shift finger and shift lever according to the principles of the present disclosure.
Figure 4B:
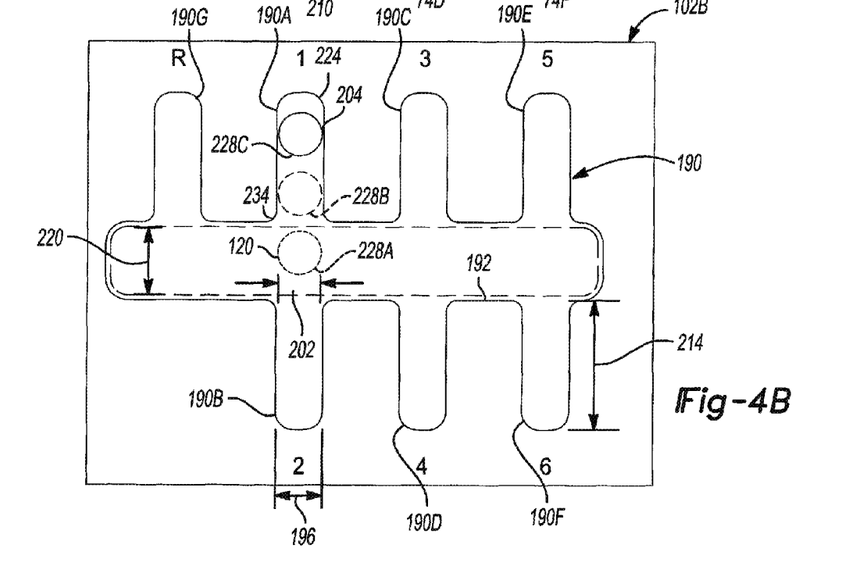

With particular reference to FIGS. 4A and 4B and continuing reference to FIGS. 1-3B, an exemplary implementation of the shift lever lead configuration is shown. The shift lever lead configuration generally operates in an opposite or substantially opposite fashion as the transmission lead configuration discussed above with reference to FIGS. 3A and 3B. In other words, the slots 74 are positioned relative to the lateral slot 78 of gate guide 42B and the channels 190 are positioned relative to the lateral channel 192 of guide plate 102B such that the shift lever 120 enters the desired one of the channels 190 before the shift finger 50 enters the corresponding one of the slots 74.

In one exemplary implementation of this shifter lead configuration, the gate guide slots 74 include a shorter length 216 than a length 214 of channels 190, as shown for example in FIGS. 4A and 4B. The lateral channel 192 of the shifter guide plate 190 also includes, in the exemplary implementation illustrated, a smaller width 220 and resulting open area than a width 222 of the lateral slot 78 of gate guide 42. It will again be appreciated, however, that the lengths/widths of the channels/slots can be varied in different implementations of the gate guide and guide plate in connection with different transmission and/or shifter implementations so long as they provide for the shift lever 120 entering channels 190 before the shift finger or similar member 50 enters the corresponding slots 74.

For example, when the shift lever 120 is used to engage one of reverse and first through sixth gears, such as first gear 62, the shift lever 120 travels from lateral channel or open area 192 toward and into channel 190A before shift finger 50 travels from corresponding lateral slot 78 into corresponding slot 74A. As the shift lever 120 is positioned in or substantially in channel 190A at position 228B, the shift finger 50 is at the entrance of or begins to enter slot 74A, as shown for example in FIGS. 4A and 4B. As can be seen in the exemplary configuration shown in FIGS. 4A and 4B, the shift finger 50 does not enter slot 74A in gate guide 42B until after the shift lever 120B has already entered corresponding channel 190A. In one exemplary implementation, shift finger 50 does not enter slot 74A in gate guide 42 until after the shift lever 120 has already entered corresponding channel 190A and is approaching the end of its travel in slot 74A.

Continuing with this example, as the shift lever 120 travels further into channel 190A and approaches or is at the end of its travel at position 228C, the shift finger 50 approaches or is at the end of its travel at position 226C. In this position, similar to the transmission lead configuration discussed above, lateral free-play or lash of shift lever 120 is substantially reduced or eliminated by the walls or sides of channel 190A restraining such movement of shift lever 120.

It will again be understood that the illustrated positions 226A-226C and corresponding positions 228A-228C in FIGS. 4A and 4B are exemplary positions for illustrative purposes only to show the shift lever 120 entry into channels 190 of shifter guide plate 102 leading the shift finger 50 entry into gate guide slots 74. In the exemplary implementation illustrated in FIGS. 4A and 4B, the channels 190 similarly include ends 224 spaced apart a predetermined distance from the typical end of travel of the shift lever 120 (e.g., position 228C) associated with the end of travel of shift finger 50 (e.g., position 226C) so as to provide a positive end-stop or over travel stop of for the shift lever 120 in the event of potentially excessive force being applied to shift lever 120.

The configurations and operational techniques discussed above in connection with FIGS. 3A-4B provide for, among other advantages, eliminating interference or fighting between the transmission gate guide 42 and the shifter guide plate 102 during the selection of a shift plane and engagement of a desired gear by shift lever 120. The shift lever guide plate 102 also advantageously reduces or eliminates lateral free play or lash of the shift lever 120 when placed in one of the reverse and first through sixth gear engagement positions.

Such free play or lash can be perceivable, for example, at the upper end of the shift lever 120, such as at the shift knob 124 by the driver of vehicle 18.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for lash reduction of a shifter for a manual transmission, the system comprising:
    a shifter assembly adapted to be positioned in an interior of a vehicle and including a housing, a shift lever pivotable relative to the housing and a shift lever guide device positioned in the housing, the shift lever guide device defining a plurality of longitudinally extending shift channels connected by a laterally extending select channel, wherein the channels define a shift pattern for the shift lever;
    a transmission gate guide associated with the manual transmission and defining a corresponding plurality of longitudinally extending shift finger slots connected by a laterally extending select slot, wherein the slots define a motion pattern for a shift finger operatively associated with the manual transmission, and wherein movement of the shift lever into one of the channels operatively moves the shift finger into a corresponding one of the slots; and
    wherein each of the channels includes a channel width complimentary to a width of a portion of the shift lever configured to be received in the channels so as to substantially reduce lateral free play of the shift lever when received in one of the channels while allowing longitudinal motion of the shift lever in the one of the channels;
    wherein one of the slots and the channels includes a shorter longitudinal length than the other of the slots and the channels such that, upon movement of the shift lever from the select channel toward one of the shift channels, the shift finger and the shift lever enter the respective one of the shift channels and corresponding shift slot at different times.

2. The system of claim 1, wherein the transmission gate guide and the shift lever guide device are configured such that upon movement of the shift lever from the select channel toward one of the shift channels, the shift finger and the shift lever enter the respective one of the shift channels and corresponding shift slot at different times.

3. The system of claim 2, wherein the transmission gate guide and the shift lever guide device are configured such that upon movement of the shift lever from the select channel toward one of the shift channels, the shift lever enters the one of the shift channels before the shift finger enters the corresponding shift slot.

4. The system of claim 2, wherein the transmission gate guide and the shift lever guide device are configured such that upon movement of the shift lever from the select channel toward one of the shift channels, the shift lever enters the one of the shift channels after the shift finger enters the corresponding shift slot.

5. The system of claim 4, wherein upon initial entry of the shift finger into the corresponding shift slot, the shift lever is positioned in the laterally extending select channel.

6. The system of claim 4, wherein a width of the laterally extending channel of the shift lever guide device in a direction of the longitudinally extending channels is greater than a corresponding width of the laterally extending slot of the transmission gate guide.

7. The system of claim 1, wherein the channel width provides a channel clearance relative to the width of the portion of the shift lever configured to be received in the channels; and wherein each of the slots is sized to include a slot width providing a slot clearance relative to a width of a portion of the shift finger configured to be received in the slots, the slot clearance being greater than the channel clearance.

8. The system of claim 1, wherein the channel width complimentary to the width of the portion of the shift lever configured to be received in the channels is sized to provide a substantially slip fit of the portion of the shift lever configured to be received in the channels and edges of the channel defining the channel width, the slip fit configured to substantially reduce lateral free play of the shift lever when received in one of the channels while allowing longitudinal motion of the shift lever in the one of the channels.

9. The system of claim 1, wherein the shift lever guide device includes a guide plate positioned within the shifter housing above a pivot of the shift lever.

10. The system of claim 9, wherein the shift lever guide device includes a guide plate positioned within the shifter housing between a pivot of the shift lever and a top of the shifter housing.

11. The system of claim 1, wherein the shift lever guide device includes a guide plate positioned within the shifter housing between a pivot of the shift lever and a bottom of the shifter housing.

12. A system for lash reduction of a shifter for a manual transmission, the system comprising:
    a shifter assembly adapted to be positioned in an interior of a vehicle and including a housing, a shift lever pivotable relative to the housing and a shift lever guide device positioned in the housing, the shift lever guide device defining a plurality of longitudinally extending shift channels connected by a laterally extending select channel, wherein the channels define a shift pattern for the shift lever;
    a transmission gate guide associated with the manual transmission and defining a corresponding plurality of longitudinally extending shift finger slots connected by a laterally extending select slot, wherein the slots define a motion pattern for a shift finger operatively associated with the manual transmission, and wherein movement of the shift lever into one of the channels operatively moves the shift finger into a corresponding one of the slots; and
    wherein each of the channels includes a channel width complimentary to a width of a portion of the shift lever configured to be received in the channels so as to substantially reduce lateral free play of the shift lever when received in one of the channels while allowing longitudinal motion of the shift lever in the one of the channels;
    wherein the channel width provides a channel clearance relative to the width of the portion of the shift lever configured to be received in the channels; and
    wherein each of the slots is sized to include a slot width providing a slot clearance relative to a width of a portion of the shift finger configured to be received in the slots, the slot clearance being greater than the channel clearance.

13. A system for lash reduction of a shifter for a manual transmission, the system comprising:
    a shifter assembly adapted to be positioned in an interior of a vehicle and including a housing, a shift lever pivotable relative to the housing and a shift lever guide device positioned in the housing, the shift lever guide device defining a plurality of longitudinally extending shift channels connected by a laterally extending select channel, wherein the channels define a shift pattern for the shift lever;

a transmission gate guide associated with the manual transmission and defining a corresponding plurality of longitudinally extending shift finger slots connected by a laterally extending select slot, wherein the slots define a motion pattern for a shift finger operatively associated with the manual transmission, and wherein movement of the shift lever into one of the channels operatively moves the shift finger into a corresponding one of the slots; and wherein each of the channels includes a channel width complimentary to a width of a portion of the shift lever configured to be received in the channels so as to substantially reduce lateral free play of the shift lever when received in one of the channels while allowing longitudinal motion of the shift lever in the one of the channels;

wherein the transmission gate guide and the shift lever guide device are configured such that upon movement of the shift lever from the select channel toward one of the shift channels, the shift lever enters the one of the shift channels after the shift finger enters the corresponding shift slot; and wherein a width of the laterally extending channel of the shift lever guide device in a direction of the longitudinally extending channels is greater than a corresponding width of the laterally extending slot of the transmission gate guide.

* * * * *